United States Patent [19]

Kaczensky et al.

[11] 4,415,231
[45] Nov. 15, 1983

[54] RADIATION SHUTTER, ESPECIALLY FOR A LASER

[75] Inventors: Friedrich Kaczensky, Putzbrunn; Walter Kroy, Ottobrunn; Günter Reithmeier, Putzbrunn, all of Fed. Rep. of Germany

[73] Assignee: Messerschmitt-Boelkow-Blohm GmbH, Munich, Fed. Rep. of Germany

[21] Appl. No.: 293,658

[22] Filed: Aug. 17, 1981

[30] Foreign Application Priority Data

Aug. 23, 1980 [DE] Fed. Rep. of Germany ....... 3031908

[51] Int. Cl.³ .............................................. G05D 25/02
[52] U.S. Cl. .................. 350/269; 250/498.1
[58] Field of Search ................ 350/266, 269, 273; 354/236; 250/229, 498.1

[56] References Cited

U.S. PATENT DOCUMENTS 4,033,693 7/1977 Payrhammer et al. ......... 350/269 X

*Primary Examiner*—William L. Sikes
*Assistant Examiner*—Matthew W. Koren
*Attorney, Agent, or Firm*—W. G. Fasse; D. H. Kane, Jr.

[57] ABSTRACT

The radiation emitted by a radiation source, such as a laser, is substantially prevented from exiting from the radiation source by a shutter in the radiation path. To make the shutter substantially fail-safe, two filter and/or diaphragm systems are switchable into the radiation path in series fashion in that one system is located behind the other system as viewed in the radiation direction. Sensors sense the effective or ineffective position of the respective system. Each system has an actuator for bringing the respective radiation stopping system into or out of the radiation stopping position in response to a control signal provided by the sensor of the respective other system.

12 Claims, 4 Drawing Figures

RADIATION SHUTTER, ESPECIALLY FOR A LASER

CROSS-REFERENCE TO RELATED APPLICATION

The present application corresponds to German Patent Application P 3,031,908.5, filed in the Federal Republic of Germany on Aug. 23, 1980. The priority of said German filing date is hereby claimed.

BACKGROUND OF THE INVENTION

The invention relates to a fail-safe radiation shutter, with filters and/or diaphragms which can be moved, for example rotated, into and out of the path of rays of an electromagnetic radiation or particle emitting device, especially a laser, by means of an electromagnetic adjusting or actuating mechanism.

For reasons of safety, so-called radiation shutters are required for the operation of a radiation emitting energy source, for example, a laser apparatus of class three and higher or an ion or electron beam mechanism, radiation intensity of which lies above a value which is hazardous to the human body. Such radiation shutters should insure that in the radiation intercepting position of the filters and/or diaphragms the emitted radiation is totally or partially absorbed or reflected and in any case lies below the respective danger threshold value.

A radiation shutter is known, for example, from the "VDI- Nachrichten" No. 26 of June 27, 1980, page 7. Such radiation shutters should not, however, be secured only against unauthorized access, but should also provide a minimum measure of intrinsic safety. Upon failure of single or several parts of the radiation shutter, for example, due to damage or material failure, the radiation shutter should continue to operate.

OBJECTS OF THE INVENTION

In view of the above it is the aim of the invention to achieve the following objects singly or in combination:

to provide an intrinsically safe radiation shutter which guarantees reliable protection against the unwanted escape of radiation, even if a single component or if several components of the shutter should fail;

to provide a certain redundancy in the components of the shutter for making it substantially fail-safe; and to use the failure of one shutter component for the control of the other shutter component and vice versa.

SUMMARY OF THE INVENTION

A substantially fail-safe radiation shutter according to the invention comprises filters and/or diaphragms which may be moved, for example by a tilting move, into and out of the path of the rays or beam of an electromagnetic radiation or particle emitting device, especially a laser. The movement is caused by means of an electromagnetic adjusting mechanism which operates two shutter devices including filter and/or diaphragm systems (7.1; 7.2) which are independent of each other and are arranged one behind the other relative to the beam or path of the rays (1). Respective sensors (10.1, 11.1, 10.2, 11.2) are arranged for checking or sensing the position of the filter and/or diaphragm systems in their swung-in or beam intercepting position and/or in their swung-out or beam passing position. The electromagnetic adjusting mechanisms (4.1, 4.2) of one filter and/or diaphragm systems (7.1, 7.2) are controllable by the sensor of the other system and vice versa.

The filter and/or diaphragm systems provided according to the invention do not simply represent a doubling of previously known systems, but rather are connected with each other in such a way that even with one defect in one system, the radiation shutter is blocked, thereby preventing the escape of radiation.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
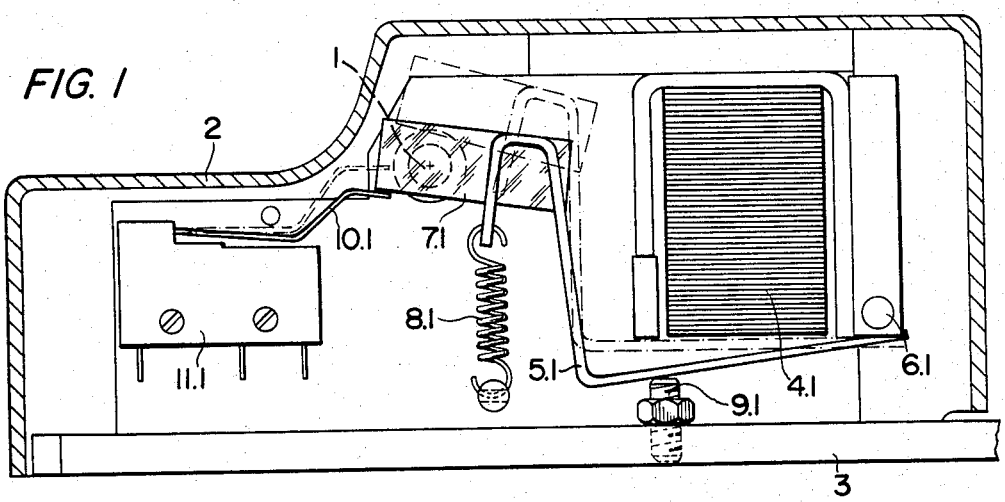
FIG. 1 shows a side view of the construction of a radiation shutter according to the invention.

The radiation shutter shown in FIG. 1 can, for example, be inserted into the external path of the rays or a beam of a laser or into its resonator beam path. Two electromagnetic adjusting mechanisms or actuator means 4.1 and 4.2 are arranged on a housing or base plate 3, one behind the other relative to the beam or path of the rays 1. The electromagnetic adjusting mechanisms comprise swivel arms 5.1 and 5.2 which are pivoted on axes 6.1. A shutter means such as a diaphragm or filter element 7.1 or 7.2 is fastened on one side to the free end of the respective swivel arm.

Since, as a rule, a so-called pilot light is used in connection with invisible radiation, which makes the beam or path of the rays 1 visible, filter glasses which are opaque only in the range of the spectrum of the invisible radiation can be used as the elements 7.1 and 7.2. The filter glasses 7.1 and 7.2 in the shown example embodiment are clamped, or if desired glued, into corresponding cutouts in the swivel arms 5.1 and 5.2 for easier exchange. The two filter glasses are held in a lower position by means of springs 8.1 which are fastened to the swivel arms 5.1 and 5.2. In this lower position, the filter glasses block the exit openings 2.1 and 2.2 of the covering hood 2 which surrounds the shutter as a housing member, thereby intercepting the beam or path of the rays 1. The exact position for the shuttering or closing of the path of the rays or beam can be adjusted by means of a correspondingly arranged variable stop screw 9.1. The filter glasses 7.1 and 7.2 press on a key lever 10.1 and 10.2, of the respective selector switches 11.1 and 11.2, each with the edge which extends beyond the cross-section of the path of the rays. The filter elements 7.1 and 7.2 are swung out of the path of the rays 1 by an actuation of the electromagnetic adjusting mechanisms or actuator 4.1 and 4.2, whereby simultaneously, the switches 11.1 and 11.2 alternate their switching positions. The swung-out position is represented by dash-dotted lines in FIG. 1. Thus, the switches 11.1 and 11.2 operate as sensor means for the position of the filter and/or diaphragm means.

Figure 2:
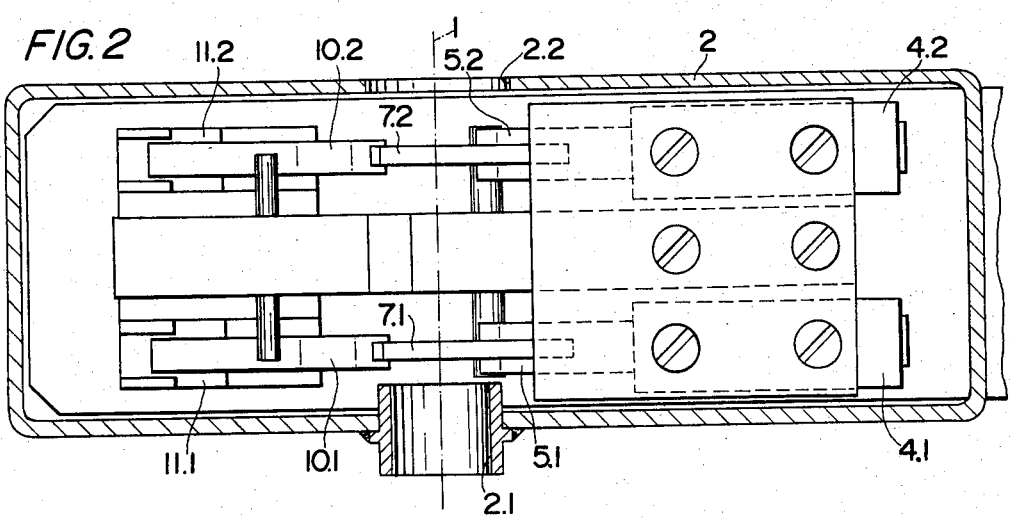
FIG. 2 shows a top plan view of the radiation shutter represented in FIG. 1 with the cover removed.
Figure 3:
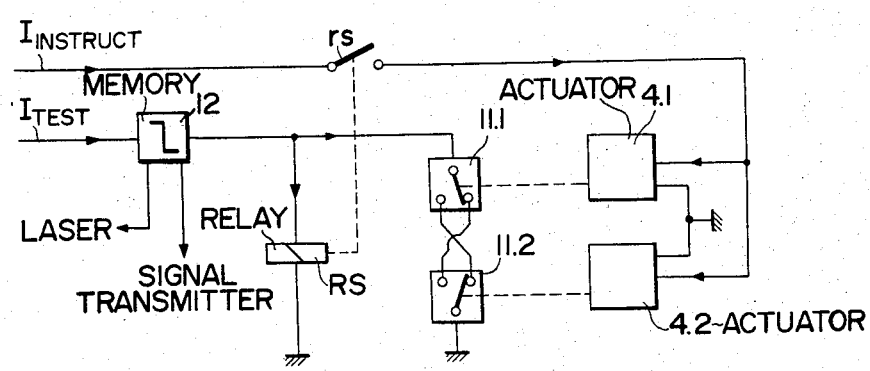
FIG. 3 shows a circuit diagram for the radiation shutter represented in FIGS. 1 and 2.

The operation of the radiation shutter shown in FIGS. 1 and 2 will be now explained in more detail with the aid of the circuit arrangement shown in FIG. 3.

The two electromagnetic adjusting mechanisms or actuators 4.1 and 4.2 are connected in parallel in branch circuits connected to an instruction circuit $I_{INSTRUCT}$. The instruction circuit is closed for the instant of the desired shot of radiation by means of, for example, a foot operated switch, so that both adjusting mechanism 4.1 and 4.2 are simultaneously switched on or off. The two selector switches 11.1 and 11.2, which are connected in a series circuit as shown which is effective only in response to a failure, undergo so-called dynamic testing by means of a test circuit $I_{TEST}$. This testing is either continuous or it occurs at the moment when the shot of radiation is released. For this purpose, the two switches 11.1 and 11.2 are wired to each other in such a way that during an orderly manner of operation of the radiation shutter, no current flow takes place through both switches when the filter elements are either in the swung-in or in the swung-out positions. The two switches 11.1 and 11.2 thus form a logic AND-gate when wired in this manner.

In the case of a failure of one of the adjustment mechanisms 4.1 or 4.2, of a sensor switch 11.1 or 11.2, or in case one of the filter glasses 7.1 or 7.2 breaks, one of the switches 11.1 or 11.2 would, at the closing of the instruction circuit, either not change its position or it would already have changed. In each case, a current flow would occur through the now series connected switches 11.1 and 11.2 which would be registered by a switching and memory mechanism 12. This switching and memory mechanism 12 can, in the simplest case, be a safety fuse which permanently breaks or opens the test circuit if a limit value is surpassed. When the test circuit is interrupted, a relay RS, which is connected in parallel with the switches 11.1 and 11.2, deenergizes and thereby opens the instruction circuit with its contact rs. The radiation shutter is then blocked against further operation and can only be opened again after the source of the fault has been eliminated and the safety fuse 12 has been renewed.

The response function of the switching and memory mechanism 12 can, for example, be indicated by means of a signal transmitter and/or it may be utilized to discontinue the power supply of the laser.

Figure 4:
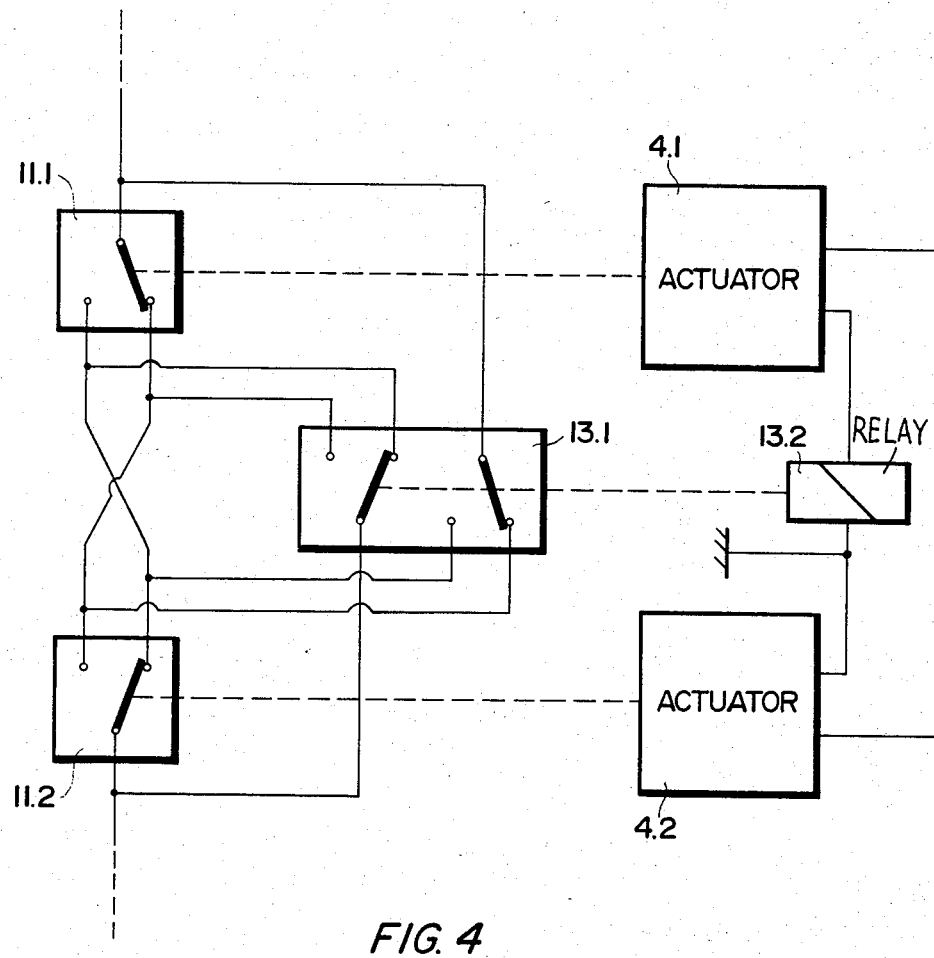
FIG. 4 shows a modification of FIG. 3 for providing a failure signal if both shutter means should fail simultaneously.

The above described radiation shutter is so constructed that it only responds to the first defect. Therefore, for example, a simultaneous break of both shutter means 7.1 and 7.2 would not cause an error or fault signal. However, FIG. 4 shows a modified circuit diagram by which a fault signal may be provided even if both shutter means 7.1, 7.2 should fail simultaneously, by means of a further, logic AND-connection 13.1, 13.2, between each switch 11.1, 11.2 and the corresponding adjusting or actuator mechanism 4.1 or 4.2, which could register whether a motion of a switch 11.1 or 11.2 occurred with or without the actuation of the corresponding adjusting mechanism 4.1 or 4.2.

Although the invention has been described with reference to specific example embodiments, it will be appreciated, that it is intended to cover all modifications and equivalents within the scope of the appended claims.

What is claimed is:

1. A radiation shutter for substantially preventing a particle or radiation beam from passing from a source through a defined beam path, comprising housing means through which said defined beam path extends, first and second shutter means movably arranged in said housing in series as viewed in the direction of said beam path, first and second actuator means operatively connected to the respective shutter means for moving the shutter means into and out of said beam path, first and second position sensor means operatively arranged for sensing the position of the respective shutter means, and electrical circuit means operatively interconnecting said sensor means and said actuator means in such a manner that the position of the first shutter means causes the operation of the second actuator means and vice versa, said radiation shutter further comprising switching memory means operatively connected to at least one of said position sensor means for storing a failure information sensed by the respective position sensor means, and means operatively connecting said switching memory means to said actuator means for switching off the actuator means in response to a stored failure information.

2. The shutter of claim 1, wherein said first and second actuator means comprise electromagnetic actuators.

3. The shutter of claim 1, wherein said electrical circuit means comprise an instruction circuit ($I_{IN\text{-}STRUCT}$), two branch circuits connecting said first and second actuator means in parallel to each other and to said instruction circuit, a testing circuit ($I_{TEST}$) including a logic AND-circuit operatively interconnecting said first and second position sensor means, and wherein said switching memory means (12, RS, rs) are responsive to said position sensor means and operatively connected to said instruction circuit for opening and closing said instruction circuit in response to information received from said position sensor means.

4. The shutter of claim 1 or 3, wherein said switching memory means comprise a relay (RS, rs) and a fuse connected in series with each other.

5. The shutter of claim 1 or 3, wherein said switching memory means are operatively connected to a source of electromagnetic radiation energy, such as a laser.

6. The shutter of claim 1, further comprising support means for movably supporting said first and second shutter means, said first and second position sensor means comprising first and second pressure responsive switches positioned to be actuated by a certain position of said first and second shutter means.

7. The shutter of claim 6, wherein said support means comprise a pivotally supported tilting arm for each shutter means, and wherein said actuator means comprise electromagnetic solenoid means arranged for tilting the respective tilting arm.

8. The shutter of claim 1, wherein said first and second shutter means comprise respective filter means for shutting out a respective radiation beam.

9. The shutter of claim 1, wherein said first and second shutter means comprise diaphragm means for shutting out a respective radiation beam.

10. The shutter of claim 1, wherein said first and second shutter means comprise filter means and diaphragm means for shutting out a respective radiation beam.

11. A radiation shutter for substantially preventing a particle or radiation beam from passing from a source through a defined beam path, comprising housing means through which said defined beam path extends, first and second shutter means movably arranged in said housing in series as viewed in the direction of said beam path, first and second actuator means operatively connected to the respective shutter means for moving the shutter means into and out of said beam path, first and second position sensor means operatively arranged for sensing the position of the respective shutter means, and electrical circuit means operatively interconnecting said sensor means and said actuator means in such a manner that the position of the first shutter means causes the operation of the second actuator means and vice versa, and support means for movably supporting said first and second shutter means, said first and second position sensor means comprising first and second pressure responsive switches positioned to be actuated by a certain position of said first and second shutter means.

12. The shutter of claim 11, wherein said support means comprise a pivotally supported tilting arm for each shutter means, and wherein said actuator means comprise electromagnetic solenoid means arranged for tilting the respective tilting arm.

* * * * *